Sept. 24, 1929.  C. B. BROWN  1,729,535
MOTOR DRIVEN PLANTER
Filed Oct. 30, 1926   4 Sheets-Sheet 4
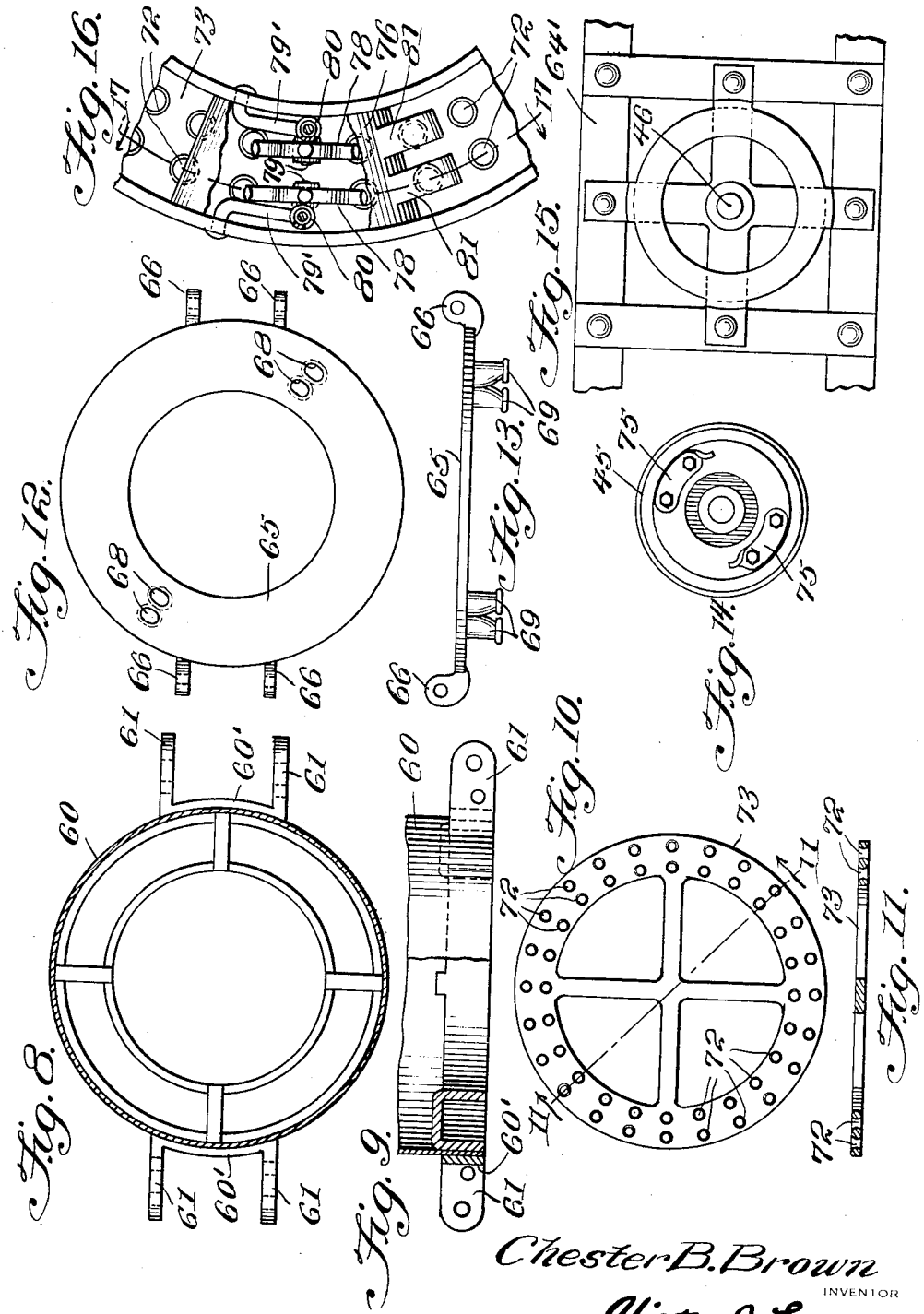

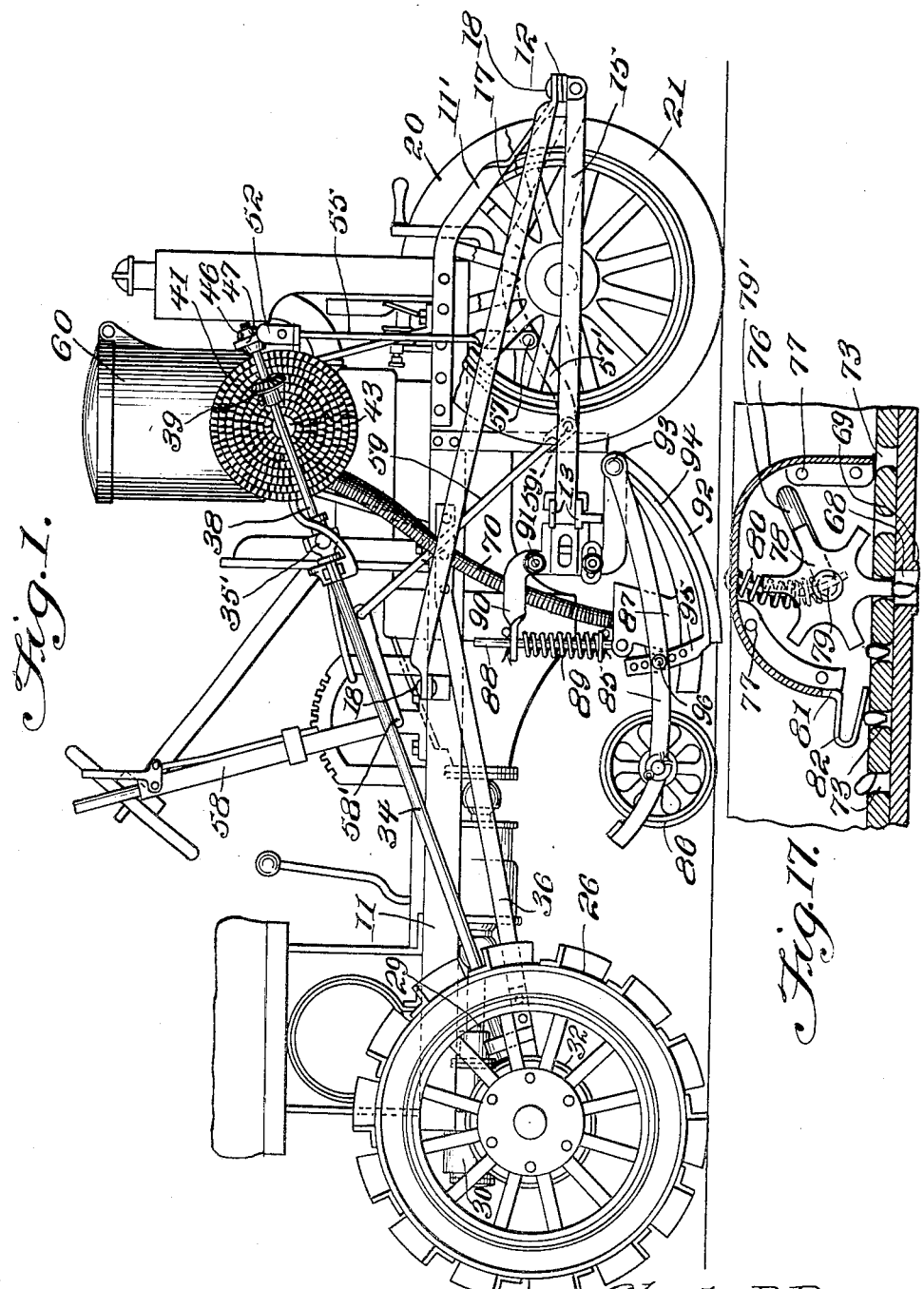

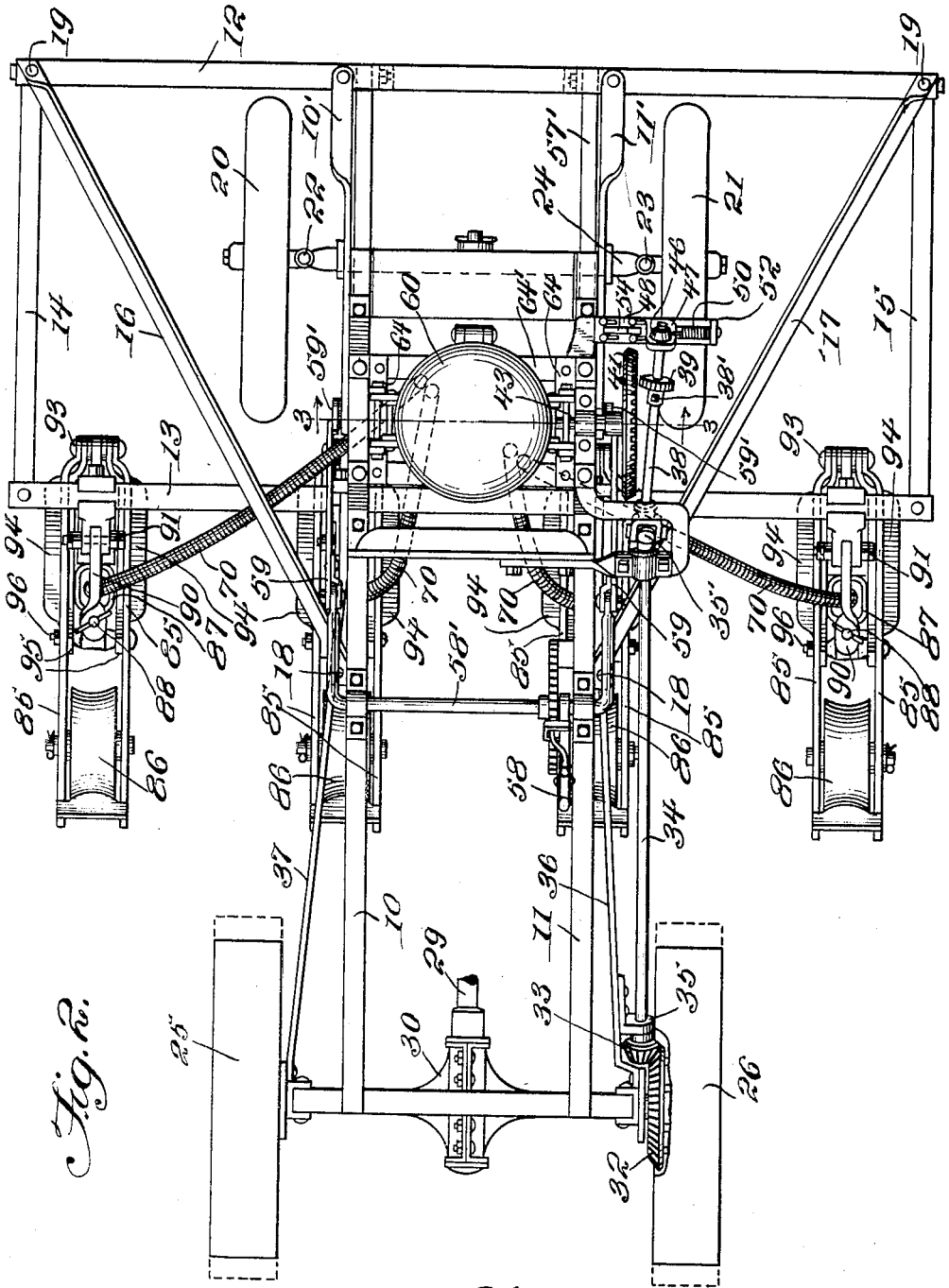

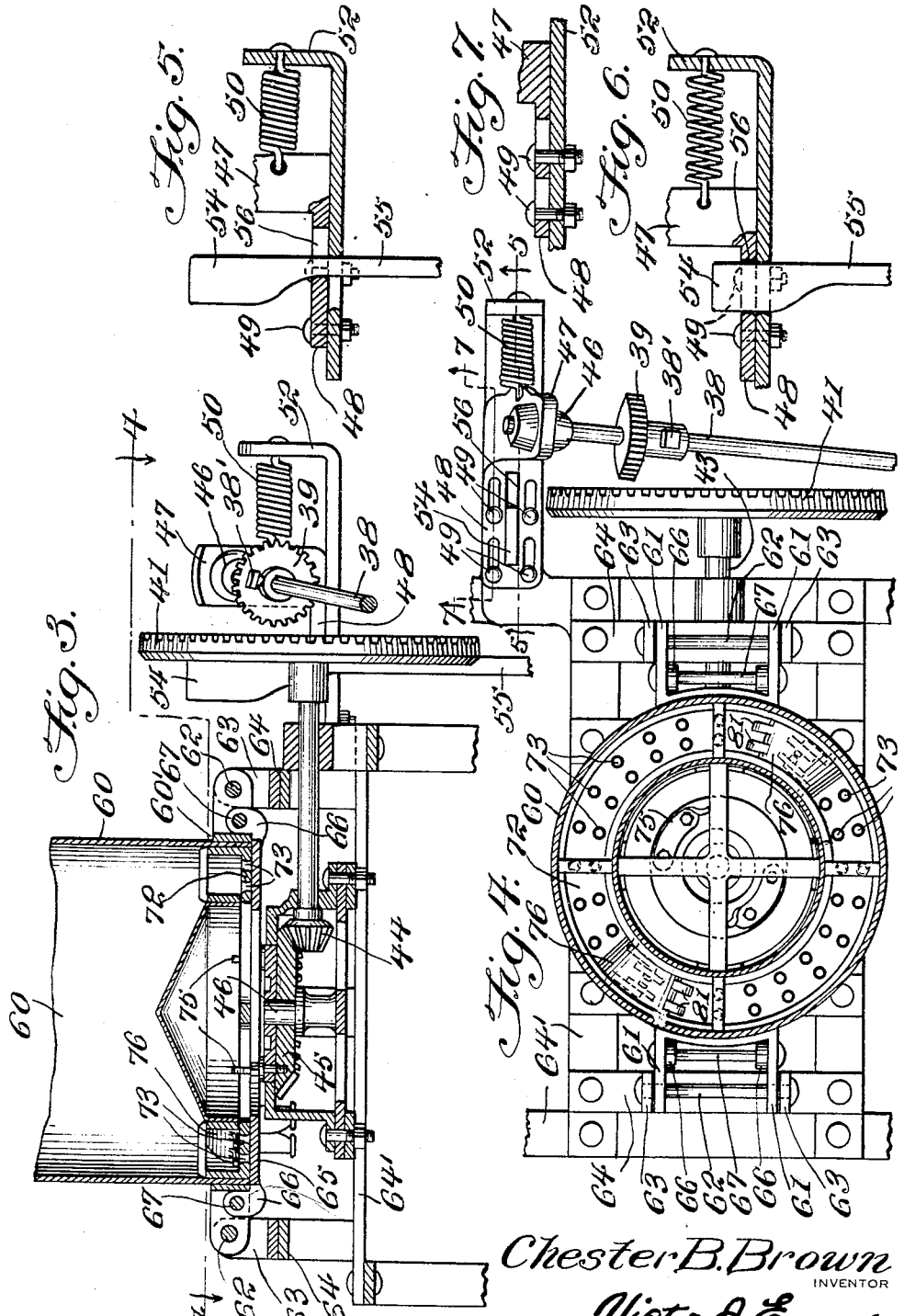

Patented Sept. 24, 1929

1,729,535

UNITED STATES PATENT OFFICE

CHESTER B. BROWN, OF MORRILL, NEBRASKA

MOTOR-DRIVEN PLANTER

Application filed October 30, 1926. Serial No. 145,290.

The object of this invention is to provide a motor driven planter for beets, beans, corn, cotton, and other crops, the machine being adapted to plant any desired number of rows within the limits of the mechanism, the space between the rows being varied to suit the conditions, and means being supplied for distributing the quantity of seed desired.

A further object is to provide for supplying all of the seeding devices or shoes from one plate, from which the seed is distributed thru flexible and resilient tubes or spouts, thereby simplifying the mechanism and reducing the cost, as compared with machines employing a plurality of complete units in connection with the seeding mechanism.

A further object is to plant at a uniform depth, regardless of the character of the surface of the ground, by employing gage bars or the like at the sides of the shoes, and springs which tend to move the shoes into the soil in depressions in the path of the machine.

A further object is to provide for a particular construction and control of the plate mechanism of the seeding apparatus.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view of the machine in side elevation.

Figure 2 is a top plan view.

Figure 3 is a vertical transverse section, on line 3—3 of Figure 2.

Figure 4 is a horizontal section, on line 4—4 of Figure 3.

Figure 5 is a section on line 5—5 of Figure 4.

Figure 6 is a section in the same plane as Figure 5, the vertically movable element being in its lower position, for shifting the spring held element movable horizontally.

Figure 7 is a section on line 7—7 of Figure 4.

Figure 8 is a horizontal section thru the lower support of the seed container.

Figure 9 is a view in elevation and section of the structure of Figure 8.

Figure 10 is a plan view of the apertured annular element of the seeder.

Figure 11 is a section on line 11—11 of Figure 10.

Figures 12 to 16 show additional elements of the seeding apparatus.

Figure 17 is a section on line 17—17 of Figure 16.

The main frame includes the central longitudinal bars 10 and 11, the front bar 12, extending transversely of the machine, and bar 13 also extending transversely, elements 12 and 13 being connected at their ends by bars 14 and 15. Braces 16 and 17 extend from the front corner portions to the central portion of the frame structure, and are secured in any suitable manner, at the points 18 and 19. Bars 10' 11' connect the forward portion of the main frame with bar 12.

The front wheels 20 and 21 are mounted for movement about vertical axes 22 and 23, to permit of guiding the machine, and the front axle is designated 24. The rear wheels 25 and 26 are driven thru gearing, not shown, of any standard type, and by line shaft 29, the gear casing being shown at 30.

Carried by wheel 26, and the hub portion thereof is a beveled gear wheel 32 adapted to mesh with a pinion 33 rigid with shaft 34 extending thru bearing 35 on brace 36, which corresponds with a brace 37 on the opposite side of the machine.

Connected with shaft 34 is a universal joint 35', and driven thru the latter is a short shaft 38 connected with the hub portion of wheel or pinion 39.

Wheel or pinion 39 is adjustable on shaft 38, by means of set screw 38', and this pinion is adapted to mesh with any one of the series of teeth on gear plate or gear wheel 41, by means of which any desired speed, within the limits of the mechanism, is to be secured.

Wheel 41 is rigid with shaft 43 carrying bevel pinion 44 meshing with gear wheel 45 mounted on a short vertical shaft 46 for driving the seeding mechanism. Shaft 38 extends thru a bearing 46 in the arm 47 of a slidable device including a plate 48 having slots therein, with pins such as 49 passing thru these slots, the plate thus being movable in a direction transversely of the machine, permitting shaft 38 and pinion 39 to be shifted, so that the latter may be thrown into and out of engagement with gear wheel 41. A spring 50, tends to draw arm 47 outwardly, this spring being connected with said arm 47 and with stationary bracket 52, on the horizontal portion of which the plate 48 is movable.

The cam end 54 of vertical bar 55 projects thru slot 56 in plate 48, and when bar 55 is lowered, the cam portion imparts thrust in the direction required for shifting plate 48, including portion 47 thereof and bearing 46 toward the main portion of the machine, thereby throwing pinion 39 into mesh with gear wheel 41.

This action, by means of which the planting or seeding mechanism is thrown into operation, takes place when the tool bar of the machine is lowered, for placing the seeding devices per se into operative position. Vertical bar 55, controlling the position of pinion 39 is connected at 57, in Figure 1 with an element 57' of the tool bar frame. This frame is controlled by lever 58, crank shaft 58' and rods 59 secured at 59' to the frame, substantially as in my U. S. Patent No. 1,601,674.

The single seed hopper 60 is mounted by a ring 60' and outwardly extending brackets 61, of Figure 4, bolts 62 passing thru these brackets and thru upstanding members 63 on bars 64 of the front frame structure extending above longitudinal bars 10 and 11 of the main frame.

Beveled gear wheel 45 is held in position in part by ring 62' within annular element 63 mounted in a fixed position in any suitable manner as indicated at 64 in Figure 3, a supporting frame being shown at 64' in Figures 4 and 15.

A stationary plate or ring 65 is mounted by ears 66, and pins 67 in brackets 61 of Figure 4, and this plate is provided with apertures 68 communicating with spout connections 69, for flexible and resilient spouts 70 leading to the individual distributing devices of Figures 1 and 2.

Upper rotary plate 72 is provided with a series of apertures 73 thru which seed passes, when the apertures register with the spout connections, plate 72 having connection by means of devices 75 with gear wheel 45, by which it is driven.

Within housing 76 mounted at 77 are spur wheels such as 78 of Figures 16 and 17, these wheels having teeth adapted to fit in the apertures of plate 72, the wheels being rotated by the disk plate and forcing any seed which has become lodged, thru the holes or distributing apertures.

The spur wheels 78 are mounted on axial members 79 and arms 79', and are resiliently held by springs 80. Springs 81 include U-end portions 82 allowing seed to pass if part way thru an aperture, thereby preventing the cutting of the seed. It is clear from Figure 17 that seed not entering the apertures in the plate a sufficient distance for use, will be prevented by elements 82 from entering the housings.

The individual planting or seeding devices or shoes each include a frame 85 mounting a wheel 86 and carried by a supporting structure adjustably mounted on tool bar 13 extending transversely of the machine. The boots 87 are resiliently mounted at the ends of spouts 70, and the upper openings of any of these spouts may be plugged if it is not desired to plant four rows, as provided for by the mechanism.

Boots 87 are held by pivoted rods 88 encircled by springs 89, the rods extending thru upper arm 90 secured at 91.

Shoes 92 pivotally secured at 93 have cooperating therewith depth gages 94 also pivoted at 93, and including arms 95 provided with a series of apertures for adjustment, a bolt 96 passing thru any of the apertures in arm 95, and thru an aperture in frame 85. Bolt 96 also passes thru a slot in each boot 87, permitting different degrees of pressure on wheels under varying conditions of the soil.

Having described the invention what is claimed is:—

1. In a motor planter, a hopper having a bottom provided with apertures therethru, a rotatable apertured plate in the hopper adjacent the bottom thereof, means for mounting and rotating the plate, seed spouts positioned below the hopper bottom and in communication with the apertures thereof, spur wheels mounted and alined with the apertures in the hopper bottom and above the plate and having teeth proportioned to enter the apertures of the plate the teeth and apertures being similarly spaced, and means including transverse axles mounting the spur wheels, and springs bearing downwardly on the axles, and adapted to resiliently press seed lodged in the apertures of said plate, thru the plate and into the apertures of the hopper bottom.

2. In a motor planter, a hopper having a bottom provided with apertures therethru, a rotatable apertured plate in the hopper adjacent the bottom thereof, means for mounting and rotating the plate, seed spouts positioned below the hopper bottom and in communication with the apertures thereof, spur wheels mounted above and alined with the apertures in the hopper bottom and above the plate and having teeth proportioned to enter the apertures of the plate the teeth and apertures being similarly spaced and means mounting the spur wheels and adapted to resiliently press seed lodged in the apertures of the plate, thru the plate and into the apertures of the hopper bottom, housings inclosing the spur wheels, and resilient devices positioned adjacent the spur wheels and adapted to prevent seed entering but not lodged in said apertures from entering the housings.

In testimony whereof I affix my signature.

CHESTER B. BROWN.